United States Patent [19]

Lösel et al.

[11] Patent Number: 4,512,785
[45] Date of Patent: Apr. 23, 1985

[54] APPARATUS FOR DRYING STEAM IN STEAM POWER GENERATING STATIONS

[75] Inventors: Georg Lösel, Uttenreuth; Egon Schneider, Grossenseebach, both of Fed. Rep. of Germany

[73] Assignee: Kraftwerk Union Aktiengesellschaft, Mülheim, Fed. Rep. of Germany

[21] Appl. No.: 479,209

[22] Filed: Mar. 28, 1983

[30] Foreign Application Priority Data

Mar. 30, 1982 [DE] Fed. Rep. of Germany ....... 3211784

[51] Int. Cl.³ ............................................. B01D 53/24
[52] U.S. Cl. ....................................... 55/204; 55/349; 55/419; 210/512.2; 122/488; 122/492
[58] Field of Search ..................... 55/21, 54, 204, 205, 55/207, 344, 349, 309, 419; 210/512.2; 122/488, 112/489, 492

[56] References Cited

U.S. PATENT DOCUMENTS

| | | | |
|---|---|---|---|
| 505,709 | 9/1893 | Larson | 122/492 |
| 2,445,502 | 7/1948 | Vaughn | 122/492 |
| 2,670,056 | 2/1954 | Rossiter | 55/344 |
| 2,731,102 | 1/1956 | James | 55/344 |
| 3,057,333 | 10/1962 | Kuhner | 55/349 |
| 3,893,922 | 7/1975 | Bobo | 210/512.2 |

OTHER PUBLICATIONS

German Publication "Dürr-Mitteilungen", Dec. 1964, p. 5.

Primary Examiner—Ernest G. Therkorn
Attorney, Agent, or Firm—Herbert L. Lerner; Laurence A. Greenberg

[57] ABSTRACT

An apparatus for drying steam in steam power generating stations, includes a plurality of cyclone separators having upper regions and lower ends, substantially tangential feed lines for a water-steam mixture leading to the upper regions of the cyclone separators, a water tank having an upper region and a lower end, respective discharge lines connected from the lower ends of the cyclone separators to the water tank, a water drain line connected to the lower end of the water tank, and equalizing lines respectively connected at an incline from the highest points of the upper regions of the water tank to a location of the upper regions of each of the cyclone separators above the feed lines.

7 Claims, 1 Drawing Figure

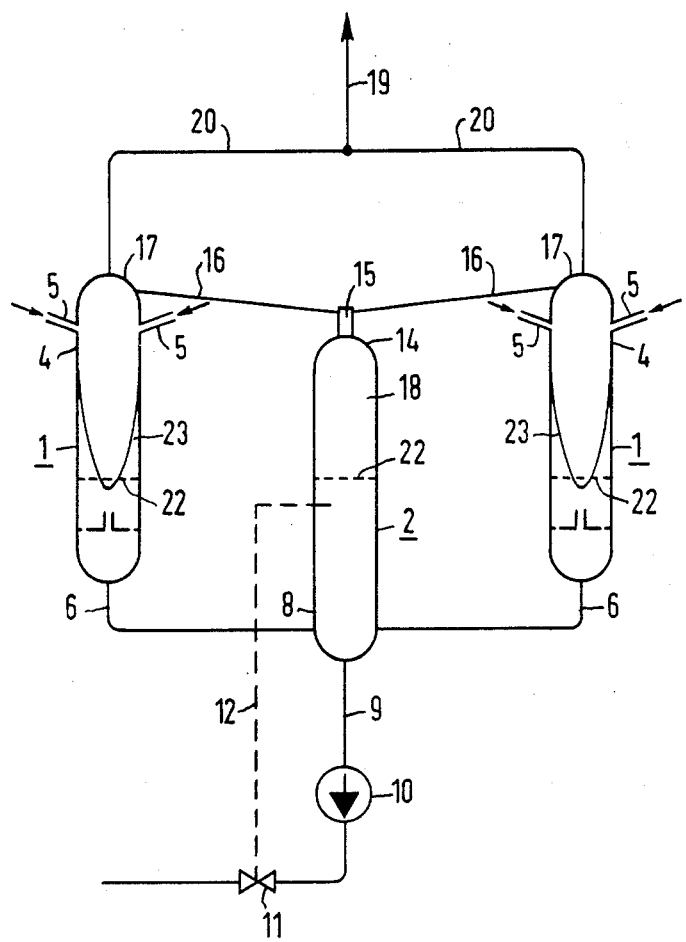

APPARATUS FOR DRYING STEAM IN STEAM POWER GENERATING STATIONS

BACKGROUND OF THE INVENTION

The invention relates to an apparatus for drying, or removing liquid, from steam in steam power generating stations, including several cyclone separators which have at least approximately tangential feed lines in upper regions thereof for a steam-water mixture, and lower ends which are connected by a discharge line to a water tank, the water tank being provided at the lower end thereof with a water drain line and at the upper region thereof with equalization lines connected to the part of the cyclone separators located above the discharge lines.

In such an apparatus, which is shown diagrammatically in issue 21 of the publication "Dürr-Mitteilungen" December 1964, Page 5, the equalizing line between the water tank and the cyclone separators is in the form of a configuration in which the steam outlet attached to the top of the cyclone separator and the water tank leads upwards into a common vertically extending steam line. In such an apparatus, instabilities can occur in spite of the water level control associated with the water tank. Such instabilities can lead, for instance, to a situation in which steam flows from individual separators through the outlet lines thereof into the water tank, while others may be overfed with water and are clogged thereby.

SUMMARY OF THE INVENTON

It is accordingly an object of the invention to provide an apparatus for drying steam in steam power generating stations, which overcomes the hereinafore-mentioned disadvantages of the heretofore-known devices of this general type, and to achieve a stabilization of the pressure and the water level.

With the foregoing and other objects in view there is provided, in accordance with the invention, an apparatus for drying steam in steam power generating stations, comprising a plurality of cyclone separators having upper regions and lower ends, substantially tangential feed lines for a water-stream mixture leading to the upper regions of the cyclone separators, a water tank having an upper region and a lower end, respective discharge lines connected from the lower ends of the cyclone separators to the water tank, a water drain line connected to the lower end of the water tank, and equalizing lines respectively connected at an incline from the highest points of the upper regions of the water tank to a location to the upper regions of each of the cyclone separators above the discharge line and above the feed lines.

As tests have shown, a more stable water level control can be obtained with the construction according to the invention, and in particular, disturbances in one of the cyclone separators can no longer affect the other separators. For all practical purposes, the penetration of steam into the water region of the water tank is prevented completely. This is surprising because there is no simple explanation for this to date. Because of the large number of parameters and the possibilities of mutual influences, a mathematical treatment also has not yet been possible.

In accordance with another feature of the invention, there is provided an extension having a smaller width than the water tank, being disposed on the top of the water tank, the equalizing lines being connected to the extension. This facilitates fabrication and is also advantageous in view of thermal stresses.

The invention is advantageously provided with the greatest possible symmetry of the apparatus. In accordance with a further feature of the invention, the cyclone separators are disposed along the circumference of an imaginary circle, the water tank is in the center of the circle, and the equalizing lines are of substantially equal length.

In accordance with an added feature of the invention, there is provided a steam line being fed from the cyclone separators, the equalizing lines forming the exclusive water-free connection from the water tank to the steam line.

In accordance with a concomitant feature of the invention, the steam line is connected to the tops of the cyclone separators. In this way, a direct connection of the water tank with the steam line can be omitted.

Other features which are considered as characteristic for the invention are set forth in the appended claims.

Although the invention is illustrated and described herein as embodied in an apparatus for drying steam in steam power generating stations, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying single FIGURE of the drawing, which is a diagrammatic and schematic circuit diagram of the apparatus according to the invention.

DETAILED DESCRIPTION OF THE DRAWING

Referring now to the FIGURE of the drawing in detail, it is seen that for the sake of clarity, only the grouping of the cyclone separators and the water tank is shown. This apparatus is placed in a steam power generating station, for instance at the same point as in the Dürr-Mitteilungen publication discussed above.

For a throughput of 2000 t/h of steam, the apparatus includes several (for instance 6) identical cyclone separators 1 which are disposed in a circle at the same height. In the center there is a water tank 2. Like the cyclone separators 1, the water tank is an elongated cylindrical tank with a vertical axis.

In an upper region 4, each cyclone separator 1 has feed lines 5 for the steam-water mixture coming from the steam boiler, particularly a Benson boiler. The feed lines 5 are distributed over the periphery thereof and discharge tangentially. Because the mixture is supplied tangentially, a centrifugal effect is obtained which causes the water of the mixture to be centrifuged downward, so that it flows into a discharge line 6.

The discharge lines 6 open laterally into a lower region 8 of the water tank 2. From the water tank 2, water can be pumped, such as by a pump 10, back into the boiler through a water drain line 9 branching off downward, through a control valve 11 which is controlled according to the water level in the water tank 2, corresponding to a functional connection 12.

A pipe stub or connecting piece 15 is centrally mounted on a domed upper end 14 of the water tank 2, as shown in the figure. Equalizing lines 16 rise uniformly from the pipe stub 15 and lead to all of the cyclone separators 1 over approximately equal lengths, of 30 m, for example, from the water tank 2. At the cyclone separators 1, the equalizing lines 16 lead into domes 17 of the cyclone separators 1 above the feedlines 5. The equalizing lines 16 are the only connection between a water-free space 18 of the water tank 2 and a steam manifold 19. The steam manifold 19 is fed by the cyclone separators 1 through steam discharge lines 20 and leads into the super-heater region of the non-illustrated steam boiler.

The equalizing lines 16 have a nominal width of at least 50 mm, so that pressure fluctuations between the separators 1 and the water tank 2 are equalized without appreciable flow resistance, and therefore without delay. In any event, stable operation is obtained with the apparatus according to the invention, in which the average water level 22, indicated by broken lines, is practically at the same height in all of the separators 1 and in the water tank 2 and can be readily controlled. However, the actual water level during the operation of the cyclone separators 1, is a paraboloid of rotation, as is well known and is indicated at reference numeral 23.

The foregoing is a description corresponding to German Application No. P 32 11 784.1, filed Mar. 30, 1982, the International priority of which is being claimed for the instant application, and which is hereby made part of this application. Any discrepancies between the foregoing specification and the aforementioned corresponding German application are to be resolved in favor of the latter.

We claim:

1. Apparatus for drying steam in steam power generating stations, comprising a plurality of cyclone separators having upper regions and lower ends, substantially tangential feed lines for a water-steam mixture leading to said upper regions of said cyclone separators, a water tank having an upper region and a lower end, respective discharge lines connected from said lower ends of said cyclone separators to said water tank, a water drain line connected to said lower end of said water tank, and a plurality of upwardly extending equalizing lines respectively connected at a lower end thereof to highest points of said upper regions of said water tank, each of said equalizing lines being connected at an upper end thereof to the upper region of a different one of said cyclone separators above said feed lines thereof.

2. Apparatus according to claim 1, including an extension having a smaller width than said water tank, being disposed on the top of said water tank, said equalizing lines being connected to said extension.

3. Apparatus according to claim 1, wherein said cyclone separators are disposed along the circumference of an imaginary circle, said water tank is in the center of said circle, and said equalizing lines are of substantially equal length.

4. Apparatus according to claim 3, including a steam line being fed from said cyclone separators, said equalizing lines forming the exclusive water-free connection from said water tank to said steam line.

5. Apparatus according to claim 4, wherein said steam line is connected to the tops of said cyclone separators.

6. Apparatus according to claim 1, including a steam line being fed from said cyclone separators, said equalizing lines forming the exclusive water-free connection from said water tank to said steam line.

7. Apparatus according to claim 6, wherein said steam line is connected to the tops of said cyclone separators.

* * * * *